(12) United States Patent
Budni

(10) Patent No.: US 7,286,587 B2
(45) Date of Patent: Oct. 23, 2007

(54) HOLMIUM DOPED 2.1 MICRON CRYSTAL LASER

(75) Inventor: Peter A. Budni, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 138 days.

(21) Appl. No.: 11/029,705

(22) Filed: Jan. 5, 2005

(65) Prior Publication Data

US 2006/0146901 A1 Jul. 6, 2006

(51) Int. Cl.
*H01S 3/091* (2006.01)

(52) U.S. Cl. .......................................... 372/71; 372/70

(58) Field of Classification Search ................. 372/70, 372/71, 69, 9, 20, 22
See application file for complete search history.

(56) References Cited

U.S. PATENT DOCUMENTS

| 4,965,803 | A | * | 10/1990 | Esterowitz et al. ............ 372/5 |
| 5,038,353 | A | * | 8/1991 | Esterowitz et al. ............ 372/41 |
| 5,289,482 | A | * | 2/1994 | Esterowitz et al. ............ 372/41 |
| 5,299,210 | A | * | 3/1994 | Snitzer et al. .................. 372/6 |
| 6,583,927 | B2 | * | 6/2003 | Choi et al. ................. 359/341.5 |
| 2004/0057105 | A1 | * | 3/2004 | Choi et al. ................. 359/341.3 |

OTHER PUBLICATIONS

PCT International Search Report dated Nov. 27, 2006 of International Application No. PCT/US2005/046052 filed Dec. 20, 2005.

* cited by examiner

*Primary Examiner*—Minsun Oh Harvey
*Assistant Examiner*—Tuan N. Nguyen
(74) *Attorney, Agent, or Firm*—Joseph E. Funk

(57) ABSTRACT

A Ho:YAG crystal laser is disclosed which is doped with less than 2% holmium to reduce the lasing threshold and up-conversion, thereby increasing the operating efficiency of the laser. The laser does not need sensitizer ions so energy mismatches introduced by the sensitizer ions ale eliminated to the thereby increase the efficiency of the laser while minimizing detrimental thermal loading in the laser caused by up-conversion loss processes. The Ho:YAG crystal laser is directly pumped by a Thulium fiber laser at 1.9 μm at the holmium $^5I_7$ to $^5I_8$ transition to produce an output at 2.1 μm yielding a very low quantum defect. The laser is embodied as a thulium fiber laser pumped oscillator or an amplifier.

15 Claims, 3 Drawing Sheets

HOLMIUM DOPED 2.1 MICRON CRYSTAL LASER

FIELD OF THE INVENTION

This invention relates generally to the field of crystal lasers doped with Holmium ions and used in amplifiers and oscillators.

BACKGROUND OF THE INVENTION

In many crystal lasers used in coherent light amplifiers and oscillators a light-emitting element is added as a dopant to a material that serves as a crystalline host. The characteristics of a crystal laser depend on the dopant and crystalline host selected. Light emitting dopant materials include all the trivalent rare earth ions.

All laser materials have characteristic energy levels and transitions so that photons are emitted at certain transitions when electrons drop from excited states to lower states. Likewise, the materials absorb light at characteristic wavelengths when they are in the ground state or other low levels.

Light absorption can be at a narrow or broad range of wavelengths depending on the transitions involved. Laser operation at the holmium $^5I_6$ to $^5I_7$, and $^5I_7$ to $^5I_8$ transitions have been reported at near 2.9 microns (μm) and 2.1 microns (μm) in several different host crystals. Consequently, laser performances using broad spectral emission pump sources have been poor except where additional sensitizer (co-dopant) ions have been used. However, the use of sensitizer ions has its shortcomings.

Thulium (Tm) sensitized holmium doped laser materials have proven to be quite useful but have several disadvantages. For example, the near energy resonance between the Tm $^3F_4$ and Ho $^5I_7$ states results in incomplete energy transfer from the sensitizer ions. At room temperature with otherwise optimal densities of sensitizer, transfer of only approximately 60% of the stored excitation density to holmium ions can occur. This incomplete transfer proportionally increases the already high lasing thresholds associated with holmium and increases thermal loading. Further, the interaction of Tm $^3F_4$ and Ho $^5I_7$ meta-stable ions create a detrimental up conversion loss process that severely limits energy storage lifetimes and small signal gains. In addition, the short pulse performance of Tm/Ho lasers are limited by the up conversion loss process and the relatively slow energy transfer from Tm $^3F_4$ and Ho $^5I_7$. Finally, the thermal loading of the Tm/Ho laser material is increased by the incomplete energy transfer and up conversion losses, thereby limiting the utility of such material for average power production. Other sensitizer co-dopants also create problems.

Thus, there is a need in the prior art for a way to improve lasing thresholds associated with holmium doped crystal lasers of oscillators and amplifiers, while reducing thermal loading, reducing up conversion losses and minimizing other problems.

SUMMARY OF THE INVENTION

The invention comprises a directly pumped, high powered, un-sensitized, rare earth, Q-switched quasi-two level crystal laser oscillator because it is pumped at a wavelength of 1.9 μm and provides an output at a wavelength of 2.1 μm which affords a number of important advantages over sensitized holmium doped lasers. These advantages include reducing the thermal loading of the laser medium, reducing up-conversion losses, increasing short pulse extraction efficiency, reducing sensitivity of the gain provided to temperature effects, and increasing the flexibility in the selection of rare earth ion concentrations and rare earth host materials.

The gain medium of the oscillator is a holmium (Ho) doped yttrium aluminum garnet (YAG) (Ho:YAG) crystal laser rod that fluoresces at 2.1 microns. The laser rod/crystal is doped with active ions of the rare earth Holmium to between 0.1 and 2.0 percent by atomic weight. Other host materials may be utilized such as yttrium lithium fluoride (YLF), yttrium aluminum oxide (YALO$_3$), and yttrium vanadate oxide (YVO$_4$).

With no sensitizer ions being added with the Holmium ions energy mismatches created by the sensitizer ions are eliminated. This results in greater energy efficiency of the laser.

The pumping laser is preferably a thulium fiber laser, well known in the art, providing an output at 1.9 μm. Other pump sources such as diode lasers and crystalline solid-state lasers may be used provided they have the correct intensity, wavelength and line width. The output from the thulium fiber laser is input to the crystal laser oscillator. The direct optical pumping of the Holmium ions by the thulium fiber laser is from the Holmium $^5I_8$ level to its $^5I_7$ level. The coherent light output from the crystal laser oscillator has a wavelength of 2.1 μm which provides a pump ratio of 0.9. This yields a very low quantum defect.

Holmium is quasi tri-level system and can absorb its own energy. This creates a problem when there is greater than 2% Holmium by atomic weight as the doping ion in the crystal. In addition, the higher the percentage of Holmium ions as the doping ions the more intense the pumping must be to reach transparency, which is the point where the Holmium ions do not absorb their own photonic radiation. Stated another way, if transparency is not reached there are not enough Holmium ions excited to higher energy levels to emit enough photons to lase. This problem is eliminated by the present invention which uses less than 2% by atomic weight of Holmium and uses the directly pumped scheme for pumping the Holmium ions in the crystal.

The aforementioned laser of the crystal laser is in a resonator cavity defined by optically-aligned, input and output mirrors along with a Q-switching acousto-optical element to output high peak power laser oscillator pulses when pumped by a thulium fiber laser and used as an oscillator. Alternatively, a holmium doped crystal can be used as an amplifier when pumped by a thulium fiber laser creating a population inversion and thus gain which can be extracted by seed pulses arriving from a 2.1 μm oscillator.

Another advantage achieved with the present invention is that there is less detrimental heat generated because with the lower percentage of doping Holmium ions, less up conversion takes place which is a prime cause of heating in a Holmium laser system. The energy produced by up conversion converts to phonons which are acoustic energy that are in turn converted to heat in a laser.

DESCRIPTION OF THE DRAWING

The invention will be better understood upon reading the following Detailed Description on conjunction with the drawing in which.

DETAILED DESCRIPTION

Figure 1:
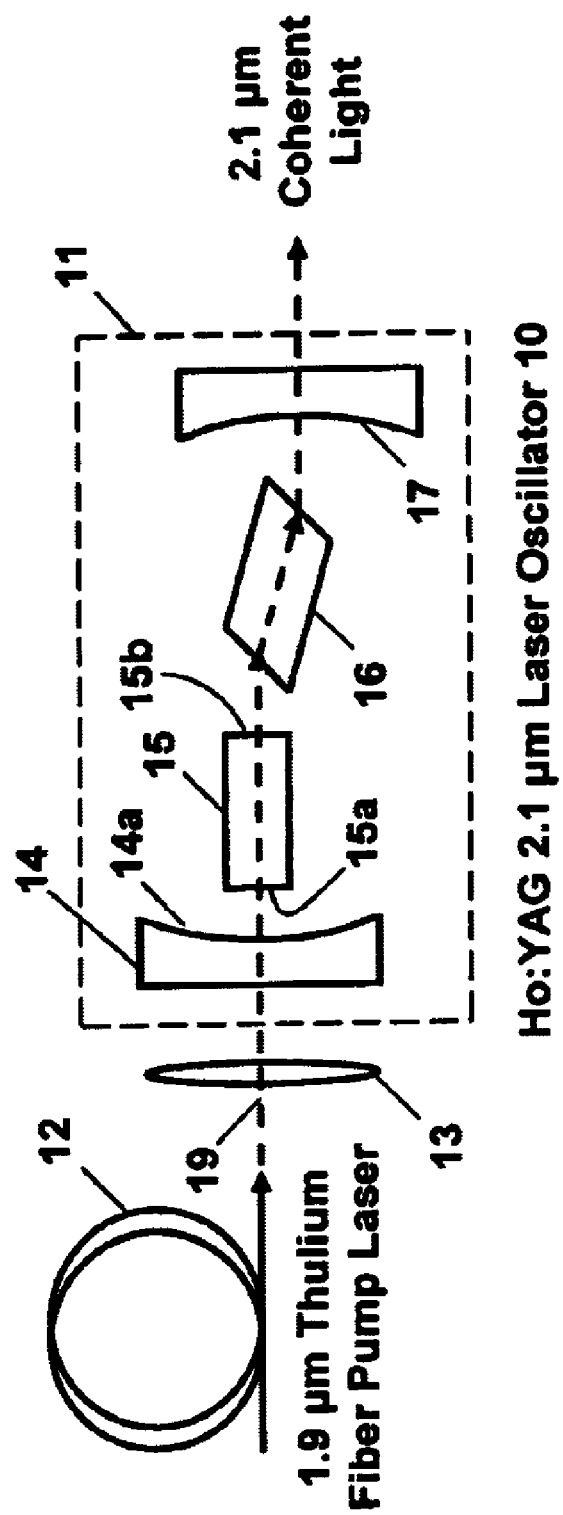
FIG. 1 is a block diagram of an oscillator utilizing the Ho:YAG crystal laser of the present invention.

In FIG. 1 shown a block diagram of a high powered, Q-switched crystalline solid state oscillator 10 using a Ho:YAG laser in accordance with the teaching of the invention. The oscillator 10 is preferably pumped by a thulium fiber laser at a wavelength of 1.9 μm and provides an output at a wavelength of 2.1 μm. The coherent light output from oscillator 10 being at a wavelength of 2.1 μm provides a pump ratio of 0.9 (1.9/2.1) which yields a very low quantum defect. Oscillator 10 may also be pumped by a thulium doped yttrium lithium fluoride (Tm:YLF) crystal laser, a thulium yttrium aluminum oxide (Tm:YAlO) crystal laser, or other 1.9 μm lasers such as laser diodes.

Very briefly, oscillator 10 comprises an input coupler 14 having a dichroic coating 14a which operates as a reflective element or mirror at the input end of resonant cavity 11 and is highly transmissive at the 1.9 μm pump wavelength. The 1.9 μm wavelength pump signal is input via input coupler 14 to directly end pump a crystal laser rod 15 that is a Holmium (Ho) doped yttrium aluminum garnet (YAG) (Ho:YAG) rod that fluoresces at 2.10 microns. YAG is a purely crystalline material in contrast to other lasing materials which are amorphous glass.

The coherent signal output is generated in the resonator defined by mirror surfaces 14a and 17, energy is stored in the laser rod or crystal 15 and is released by Q-switching with the use of acousto-optical element 16 to obtain high peak power output pulses at a wavelength of 2.1 μm.

Laser rod or crystal 15 and Q-switching acousto-optical element 16 are mounted in a laser resonator cavity 11 defined by optically-aligned, input and output reflective elements or mirrors 14a and 17.

More specifically, thulium doped optical fiber lasers are known in the art and may be single mode, double clad fiber including a thulium doped core glass, an inner surrounding layer of clad glass having a lower refractive index than the core glass, and an outer surrounding layer of clad glass having a lower refractive index than the inner surrounding layer of clad glass. The thulium doped fiber is pumped by a light emitting device of many types including laser diodes that are optically coupled to the fiber. The thulium doped optical fiber lasers may also be a photonic crystal fiber as long as the core is doped with thulium active ions. In FIG. 1 the 1.9 μm wavelength thulium fiber pump laser 12 may be operating in a continuous wave (CW) or pulsed mode. When shorter time duration pulses, with less power and with a high repetition rate in the order of 10 or 20 KiloHertz (KHz) are to be output from oscillator 10, pump laser 12 will typically be operated in a continuous wave (CW) mode. Otherwise pump laser 12 may be operated in a pulsed or storage mode at a level to provide the desired output from laser 15 and minimizing unwanted up conversion to the holmium $^5I_5$ level.

Lens 13 condenses the 1.9 μm wavelength coherent light output from pump laser 12 and focuses it into resonator cavity 11 through the dichroic mirror 14a of input coupler 14 to mode match the pump and lowest order resonator mode. If thulium fiber laser 12 has an integral focusing lens, a separate lens 13 may not be needed. Coupler 14 has a dichroic mirror 14b that helps define cavity 11, to directly end pump crystalline laser 15 which is a Holmium (Ho) doped yttrium aluminum garnet (YAG) crystal rod 15 (Ho:YAG) that fluoresces at 2.10 microns. Dichroic mirror surface 14a and mirror 17 at the other end of resonator cavity 11 face each other on a common optical axis to form a reflective path between elements 14a and 17 required for laser 11 to lase.

Coupler element 14 has a dichroic coating 14a facing the resonator cavity and operates as both an input element and mirror. The dichroic coating on surface 14a of mirror 14 has a high transmission (about 96%) at the input pump wavelength of 1.9 μm and a high reflection (about 99%) at a wavelength of about 2.1 μm. Thus 1.9 μm coherent light from pump 12 passes easily into resonant cavity 11 and the 2.1 μm wavelength coherent light generated by the Ho:YAG laser crystal 15 of oscillator 10 does not escape resonator cavity 11 toward pump laser 12. Surface 14a of element 14 on which is the dichroic coating is concave and has an exemplary ten meter radius of curvature. It should be understood that the dichroic mirror could instead be deposited directly onto input end 15a of Ho:YAG crystal laser rod 15.

To make Ho:YAG crystal rod 15 a YAG crystal is doped with Holmium ions to less than 2% by atomic weight. The term doping means to use a small concentration of an added material that does not significantly affect the properties of the material. The holmium dopant is added to a batch of molten yttrium aluminum garnet (YAG) material from which the Ho:YAG crystal rod is drawn and is then finished into crystal laser rod 15. Having this low level of doping reduces the laser "transparency" problem and therefore the threshold oscillation. The end faces 15a and 15b of laser rod 15 are preferably flat and parallel to each other. However, if required, the surfaces 15a and 15b may be altered to be concave or convex to ameliorate any thermal lensing problems. Also, end surfaces 15a and 15b of the laser crystal rod 15 preferably have an anti-reflection coating (not shown) to transmit highly the 1.9 μm pump and resonant field at 2.1 microns. Optical coatings that are anti-reflective at selected wavelengths may be applied to any surface in which the laser beam enters and exits in an effort to increase the efficiency of the process.

More particularly, Ho:YAG crystal rod 15 is doped with between 0.1% and 2.0% by atomic weight with holmium. With this lower percentage of doping with Holmium ions than normally used in the prior art, less "up conversion" takes place where unconverted pump energy becomes heat which is a prime cause of troublesome heating in Holmium lasers. The energy produced by up conversion converts to photons which are acoustic energy which is in turn converted to unwanted heat energy in crystal laser 15. Unwanted up conversion in crystal laser 15 occurs when the holmium doping ions at the $^5I_8$ level are pumped past their $^5I_7$ level to their $^5I_5$ level and decreases the efficiency of laser 15.

There is strong evidence that up conversion losses due to direct interaction among Ho $^5I_7$ ions are very small compared to losses due to the interactions of Ho $^5I_7$ ions with ions of sensitizer or co-doping materials such as Thulium.

Thus, by reducing the up conversion losses by not using sensitizer or co-doping materials the efficiency of crystal laser 15 is increased.

The direct optical pumping of the Holmium ions by pump laser 12 at 1.9 μm is pumping from the Holmium $^5I_8$ level to the $^5I_7$ level. This creates a quasi two-level system ($^5I_8$ and $^5I_7$) and the quasi two level system absorbs its own energy if there is not enough population inversion to reach "transparency". The holmium dopant concentration is a lever which allows for the management of threshold to laser emission and up-conversion. The lower the dopant concentration the lower is the pump intensity needed to achieve emission, but the less absorption of pump light occurs. In addition, the higher the concentration of doping material the higher the up-conversion that occurs. Consequently there is a balance between absorption efficiency rod length lasing threshold and up-conversion.

In the prior art sensitizer ions are typically added along with the Holmium ions in a crystal laser, but this is not done with the present invention. Sensitizer ions are added in the prior art to improve the efficiency of a laser by allowing absorption of pump radiation to transfer to the lasing ion (Holmium). Thulium (Tm) has proven to be an effective sensitizer for Holmium. However, the use of sensitizers has severe disadvantages for power scaling. For example, the near energy resonance between Tm $^3F_4$ and Ho $^5F_7$ levels results in incomplete energy transfer from the sensitizer ions. At room temperature with otherwise optimal densities of sensitizer ions, there is only a small fraction of energy transfer to the Holmium ions and this limits efficiency and power scaling. This incomplete transfer proportionally increases the already high lasing thresholds associated with Holmium. Further, the interaction of Tm $^3F_4$ and Ho $^5F_7$ meta-stable ions create a detrimental up conversion loss process that severely limits energy storage lifetimes and small signal gains.

With no sensitizer ions being added with the Holmium ions with the present invention the above described energy mismatches and inefficiencies created by sensitizer ions are eliminated. This results in greater energy efficiency of crystal oscillator 10.

Q-switching is a technique used to obtain high peak power laser pulses. Q-switching is performed by controlling Q-switching oscillation to modulate the losses in a resonator cavity 11 by abruptly changing a loss of resonant laser light passing through resonator cavity 11. Acousto-optic Q-switches are well known in the art, are often made from fused silica or crystal quartz, and are powered from an RF source connected to a transducer mounted to the silica substrate of the Q-switch.

Energy builds up in crystal laser 15 until Q-switch 16 is operated to dump energy from laser rod 15 as 2.1 μm wavelength coherent light. With Q-switching the stored energy is extracted from laser oscillator 10 in high peak power pulses.

The pulses of coherent light output from Q-switch 16 impinge upon the concave surface of output mirror 17 which defines the output end of resonator cavity 11. Mirror 17 has an exemplary infinite radius of curvature and its reflectivity varies depending on the application of oscillator 10. When oscillator 10 is operating in storage mode, with the thulium fiber pump laser 12 providing pulses of 1.9 μm coherent light, the reflectivity of mirror 17 is nominally between 20% and 30% depending on the application. When oscillator 10 is operating in a CW mode the reflectivity of mirror 17 in nominally between 50% and 70% depending on the application. Thus, mirror 17 operates as an output coupler to output a portion of the coherent light generated within Ho:YAG laser crystal 15 when it is pumped by the 1.9 μm laser emission from pump laser 12.

As previously described the coherent light output from oscillator 10 being at a wavelength of 2.1 μm provides a pump ratio of 0.9 (1.9/2.1) which yields a very low quantum defect which reduces unwanted heat generated in the Ho:YAG laser 15 of oscillator 10. The quantum defect (i.e. the pump wavelength is shorter and more energetic than the output wavelength) typically results in heat generation within the crystal laser 15. The increase in temperature increases the laser threshold and robs efficiency. Stated another way the quantum defect accounts for the energy difference between the pumping and lasing fields, which can be given up as heat in crystal laser 15. The high pump ratio of 0.9 for crystal laser 15 yields a low quantum defect with greatly reduced heat generation and higher efficiency.

A material that is capable of lasing in a transition between two energy levels shows fluorescence at the wavelength corresponding to that transition between the two atomic energy levels or states. Atomic energy levels are the specific energy levels that electrons can occupy for a specific element if given a sufficient amount of energy is added to the electrons to raise them from one energy level to a higher energy, and FIG. 2 is an energy level diagram of some of the energy levels for Holmium.

Figure 2:
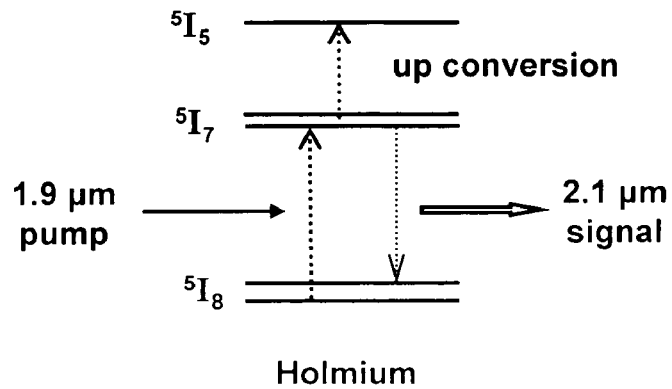
FIG. 2 is an energy level diagram which illustrates the pumping transitions for the Holmium doped Ho:YAG crystal laser of the present invention shown in FIG. 1.

In FIG. 2 is shown an energy level diagram which illustrates the pumping transitions for the Holmium doped Ho:YAG crystal laser rod 15 for the present invention. Three energy levels $^5I_8$, $^5I_7$ and $^5I_5$ of Holmium are shown. The preferred operation of laser 15 is to use the 1.9 μm wavelength output from thulium fiber laser pump 12 to pump the energy levels of Holmium ions from their $^5I_8$ level to their $^5I_7$ and let them undergo a transition back to their lower energy level $^5I_8$. In the process photons are emitted providing the 2.1 μm wavelength output from crystal laser 15 of oscillator 10. Further transfer of energy to the $^5I_5$ level by up conversion rather than by pumping is undesired because it does not contribute to the generation of 2.1 μm wavelength light.

Figure 3:
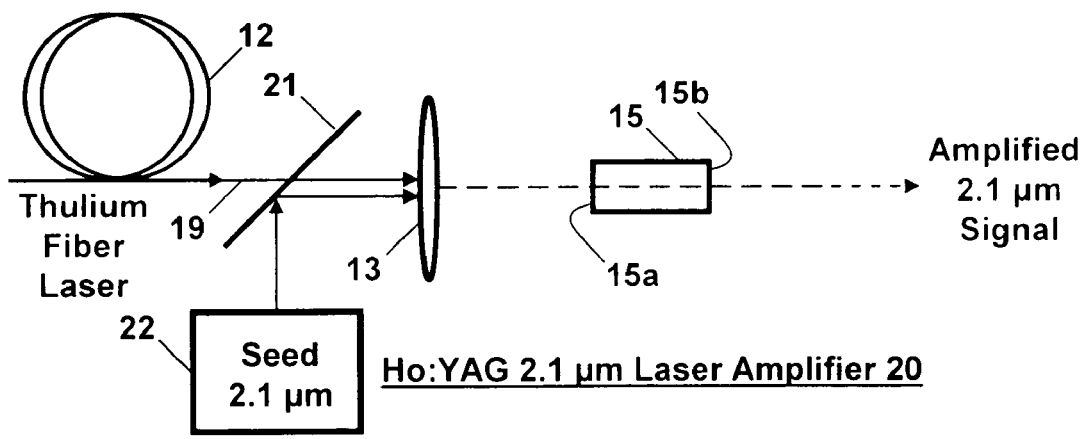
FIG. 3 is a block diagram of an amplifier utilizing the Ho:YAG crystal laser of the present invention where both a 1.9 μm Tm fiber laser pump and a seed pulse make a single-pass through the laser.

In FIG. 3 is shown a block diagram of a Ho:YAG 2.1 μm laser amplifier 20 for amplifying 2.1 μm seed pulses utilizing the Ho:YAG crystal laser rod 15 of the present invention.

Very briefly, Ho:YAG 2.1 μm laser amplifier 20 comprises a pulsed or continuous wave (CW) 1.9 μm wavelength pump signal from a thulium fiber laser 12 and seed pulses to be amplified from a 2.1 μm seed source 22 are input via a mirror 21 to directly end pump a crystal laser rod 15 and achieve a population inversion (gain) thus storing energy. The collinear 2.1 μm seed then extracts the stored energy and is thus amplified. The 1.9 μm pump signal passes through mirror 21 and the 2.1 μm seed signal to be amplified is reflected from mirror 21 as shown in FIG. 3. Alternatively, a different mirror 21 may be used with the 2.1 μm seed signal to be amplified passing through the mirror and the 1.9 μm pump signal being reflected from the mirror. The timing of the pump signal and the seed signal being amplified are described in further detail hereinafter with reference to FIG. 4.

The Ho:YAG crystal laser 15 is the same as previously described with reference to FIG. 1 so its descriptions is not repeated here except to point out the differences with the oscillator and to repeat the following highlights of the Ho:YAG crystal laser in an amplifier configuration.

As previously described with reference to FIG. 1 no sensitizer ions are needed or added to Ho:YAG crystal laser rod 15 and the problems sensitizer ions create in limiting efficiency, power scaling and creating detrimental up conversion are eliminated. Larger energy storage lifetimes are achieved and higher small signal gains are achieved.

Figure 4:
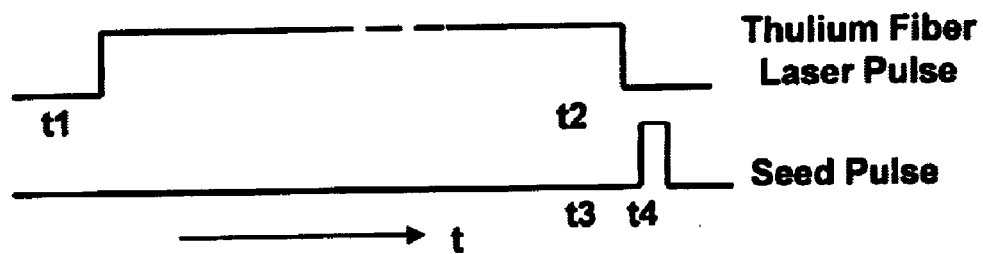
FIG. 4 is a timing diagram showing the relative time duration of pulses and pulse triggering by a seed pulse of the Ho:YAG crystal laser when used as a pulse amplifier.

Energy builds up in crystal laser 15 during the period of each pulse from thulium fiber pump laser. Each pump pulse is in the order of milliseconds when operated in the storage mode as shown in FIG. 4. At the end of each pump laser pulse, while the Ho:YAG crystal laser rod 15 is charged with energy, a low power, short, 2.1 µm seed pulse is applied to laser 15 via mirror 21 to cause the stored energy in laser 15 to be released as a higher power pulse having the same duration as the seed pulse. The result is an amplified seed pulse. The time duration of the seed pulse is nominally in the order of twenty nanoseconds.

In FIG. 4 is a timing diagram showing the relative time duration of pulses and pulse triggering of the Ho:YAG crystal laser when used as a pulse amplifier. As previously described thulium fiber pump laser 12 generates a string of 1.9 µm pulses, only one of which is represented in FIG. 4. The width of each of these pump pulses (t1-t2) is in the order of milliseconds and the width of each of the seed pulses (t3-t4) is in the order of twenty nanoseconds. The 1.9 µm pump pulses charge the Ho:YAG crystal achieving high population inversion (gain) and stored energy, following the charging the seed pulse extracts the stored energy with the production of an amplified seed pulse. If the seed pulse interval is short (<1000µ seconds) the amplifier may be pumped continuously by the Tm fiber laser and a condition of extract while pumping is possible.

Figure 5:
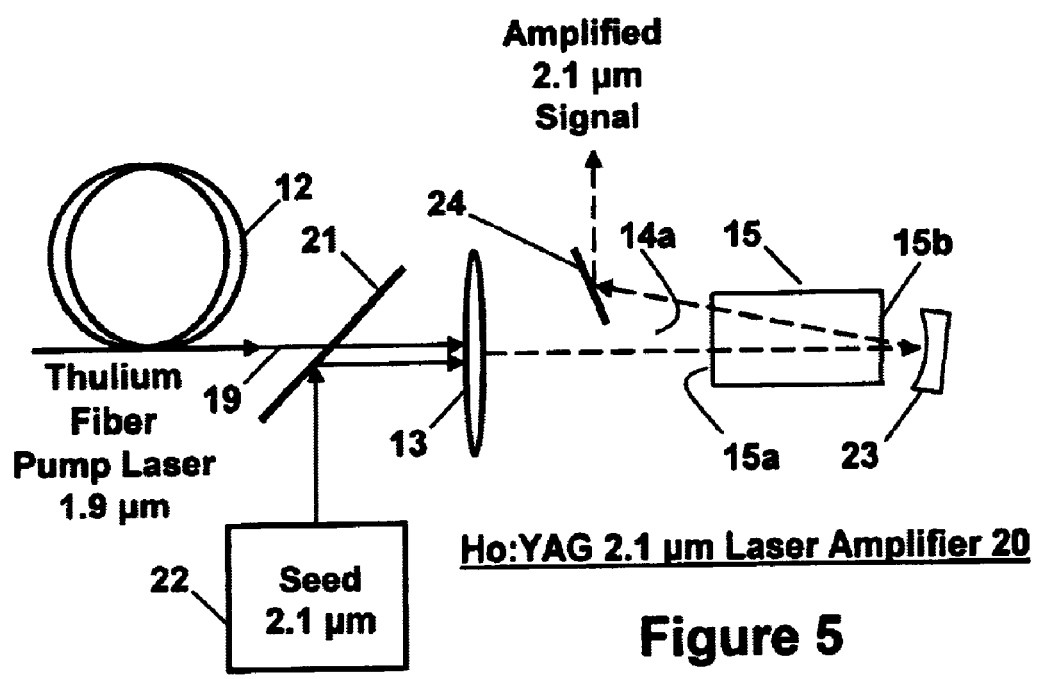
FIG. 5 is a block diagram of an alternative embodiment of the Ho:YAG crystal laser used as an amplifier where both a 1.9 μm Tm fiber laser pump and a seed pulse make a double-pass through the laser.

In FIG. 5 is shown a block diagram of an alternative embodiment of the Ho:YAG crystal laser 15 used as an amplifier. When comparing FIG. 4 to FIG. 5 it is seen that some of the design is the same so the descriptions of the thulium fiber pump laser 12, mirror 21 and Ho:YAG crystal laser rod 15 are the same and are not repeated here. This embodiment of an amplifier using the Ho:YAG crystal laser provides increased amplifier efficiency. Mirror 23 is tilted slightly, as shown, so its optical axis is offset slightly from the co-axial optical axis of laser rod 15. Mirror 23 reflects one-hundred percent of the 2.1 µm laser beam energy output from laser 15 back along a slightly different path through laser 15 to impinge on mirror 23. To transmit the reflected beam back along the same coaxial axis of laser 15 is very detrimental. The tilted mirror 23 reflects the beam along a slight different path through laser 15 to mirror 24 which reflects the 2.1 µm laser beam to an output from the amplifier as an amplified version of each seed pulse. This operation provides greater amplifier efficiency by increasing the extraction.

While what has been described is the preferred embodiments of the invention it will be understood by those skilled in the art that numerous changes may be made without departing from the spirit and scope of the invention.

The invention claimed is:

1. A Ho:YAG crystal laser amplifier with a separate thulium fiber coherent light pump source at a wavelength of 1.9 µm to amplify a signal having a wavelength of 2.1 µm by directly end pumping the Ho:YAG crystal laser at its $^5I_7$ to $^5I_8$ transition, the Ho:YAG crystal laser amplifier comprising:
    a yttrium aluminum garnet (YAG) crystal host rod doped with less than 2% holmium (Ho) active ions, and having a length long enough to produce an output laser emission with less than 2% holmium active ions in the Ho:YAG crystal laser; and
    wherein the Ho:YAG crystal laser has a quantum defect less than 1.0 when the holmium ions are directly pumped from the pump source to produce an output laser emission having a wavelength of 2.1 µm.

2. The Ho:YAG crystal laser amplifier of claim 1 further comprising a source of seed pulses to cause amplified pulses to be output from the laser when it is used as an amplifier.

3. The Ho:YAG crystal laser amplifier of claim 1 wherein the laser has no sensitizer ions to thereby eliminate any energy mismatches caused by sensitizer ions, and thereby increase the efficiency of the laser while minimizing detrimental thermal loading in the laser caused by up-conversion loss processes.

4. The Ho:YAG crystal laser amplifier of claim 3 wherein the pump source provides an output at a wavelength of 1.9 µm that is used to directly pump the holmium doped laser at the holmium $^5I_7$ to $^5I_8$ transition.

5. The Ho:YAG crystal laser amplifier of claim 4 further comprising a source of seed pulses to cause amplified pulses to be output from the laser when it is used as an amplifier.

6. The Ho:YAG crystal laser of claim 4 wherein the coherent light pump source is a thulium fiber laser that provides an output at a wavelength at or near 1.9 µm that is used to directly pump the holmium doped laser at the holmium $^5I_7$ to $^5I_8$ transition.

7. A holmium doped yttrium aluminum garnet (YAG) crystal laser amplifier comprising:
    a crystal host material doped with less than 2% active ions, and having a length long enough to produce an output laser emission with that low level of doping when pumped; and
    a thulium fiber laser pump source that provides an output at a wavelength of 1.9 µm that is used to directly pump the holmium doped laser amplifier at the holmium $^5I_7$ to $^5I_8$ transition, wherein the holmium doped host material has no sensitizer ions to thereby eliminate any energy mismatches caused by sensitizer ions, and thereby increase the efficiency of the laser amplifier while minimizing detrimental thermal loading in the laser amplifier caused by up-conversion loss processes.

8. The holmium doped crystal laser amplifier of claim 7 further comprising a source of seed pulses that when input to the holmium doped crystal host material causes amplified pulses to be output from the laser amplifier.

9. The holmium doped crystal laser amplifier of claim 7 wherein the doping with less than 2% holmium active ions in the YAG crystal host rod reduces unwanted up-conversions losses in the laser which thereby helps to minimize detrimental thermal loading in the laser amplifier.

10. A holmium doped crystal laser of claim 9 wherein the doping with less than 2% holmium active ions reduces absorption of its own energy to thereby increase the operating efficiency of the laser amplifier.

11. A laser crystal amplifer for amplifying seed pulses and the amplified pulses have a wavelength of 2.1 microns, the laser crystal amplifier comprising:
    a laser crystal having a host material doped with less than 2% holmium active ions, and having a length long enough to produce an output laser emission;
    a pump laser for generating a pump beam having a wavelength of 1.9 microns that is imput to the laser crystal of the amplifier; and
    optical means for combining the pump beam and the seed pulses to be amplified before they are input to the laser crystal;
    wherein each time a seed pulse is input to the laser crystal along with the pump beam there is a pulse output from the laser crystal, and the output pulse is an amplified version of the seed pulse, and wherein the holmium doped host material has no sensitizer ions to thereby eliminate any energy mismatches caused by sensitizer ions, and thereby increase the efficiency of the laser amplifier while minimizing detrimental thermal loading in the laser amplifier caused by up-conversion loss.

12. The laser crystal amplifier of claim 11 wherein the pump laser is a thulium fiber laser.

13. The laser crystal amplifier of claim 12 wherein the host material of the holmium doped laser crystal is yttrium aluminum garnet (YAG) the output laser emission from which is at 2.1 microns yielding a pump ratio of 0.9 and thereby a very low quantum defect for the laser crystal.

14. The laser crystal amplifier of claim 11 wherein the pump beam output from the pump laser and input to the laser crystal is pulsed, and the seed pulses to be amplified are input to the laser crystal via the optical mean after each pulse from the pump laser.

15. The laser crystal amplifier of claim 14 wherein the optical means has a high transmissivity at the pump wavelength of 1.9 microns and a high reflectivity at substantially 2.1 microns to input the seed pulses and the pump beam along the same optical path to be input on the laser crystal.

* * * * *